(12) United States Patent
Hamaguchi et al.

(10) Patent No.: US 8,168,919 B2
(45) Date of Patent: May 1, 2012

(54) LASER WORKING APPARATUS AND METHOD OF CONTROLLING LASER WORKING APPARATUS

(75) Inventors: Yuji Hamaguchi, Isehara (JP); Nobuhiro Yoshikawa, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1235 days.

(21) Appl. No.: 11/889,387

(22) Filed: Aug. 13, 2007

(65) Prior Publication Data

US 2008/0035619 A1 Feb. 14, 2008

(30) Foreign Application Priority Data

Aug. 14, 2006 (JP) ................. 2006-221297

(51) Int. Cl.
*B23K 26/24* (2006.01)
*G06F 19/00* (2011.01)

(52) U.S. Cl. ......... 219/121.63; 219/121.64; 219/121.76; 219/121.8; 700/166

(58) Field of Classification Search .............. 219/121, 219/73, 121.76, 121.78, 121.79, 121.8, 121.81, 219/121.63, 121.64; 700/166
See application file for complete search history.

(56) References Cited

U.S. PATENT DOCUMENTS

| | | | | |
|---|---|---|---|---|
| 4,584,455 A | * | 4/1986 | Tomizawa ................. | 219/121.78 |
| 4,769,523 A | | 9/1988 | Tanimoto et al. | |
| 4,820,899 A | * | 4/1989 | Hikima et al. ............ | 219/121.76 |
| 5,153,409 A | * | 10/1992 | Rudaitis et al. .......... | 219/121.83 |
| 5,670,068 A | * | 9/1997 | Kuriyama et al. ....... | 219/121.83 |
| 6,763,284 B2 | * | 7/2004 | Watanabe et al. ........ | 219/121.78 |
| 6,818,858 B2 | * | 11/2004 | Yasoda et al. ............ | 219/121.73 |
| 2005/0150876 A1 | * | 7/2005 | Menin et al. ................... | 700/166 |

FOREIGN PATENT DOCUMENTS

| | | | |
|---|---|---|---|
| EP | 1 125 695 A2 | | 8/2001 |
| EP | 1 671 740 A1 | | 6/2006 |
| JP | 9-141474 A | * | 6/1997 |
| JP | 10-180471 A | * | 7/1998 |
| JP | 11-156569 A | * | 6/1999 |
| JP | 2000-263273 A | * | 9/2000 |
| JP | 2001-105137 A | | 4/2001 |
| JP | 2005-103614 A | | 4/2005 |
| JP | 2005-177862 A | | 7/2005 |
| JP | 2006-187803 A | * | 7/2006 |
| KR | 1995-028855 | | 11/1995 |
| KR | 10-2004-0090643 A | | 10/2004 |

OTHER PUBLICATIONS

Machine translation of Japan Patent document No. 11-156,569, Mar. 2011.*

* cited by examiner

*Primary Examiner* — Geoffrey S Evans
(74) *Attorney, Agent, or Firm* — Foley & Lardner LLP

(57) ABSTRACT

A laser working apparatus includes: a laser head provided with a reflector which changes the direction of any one of a laser beam and a visible light; a robot which moves the laser head; and a robot control apparatus. When laser working is performed, the robot control apparatus controls the laser head so that the laser beam can draw a predetermined working pattern on the basis of a predetermined working position on a work piece. When an operation checking work is performed, the robot control apparatus controls the laser head so that the visible light beam can be emitted only to a reference position of the working pattern.

11 Claims, 13 Drawing Sheets

LASER WORKING APPARATUS AND METHOD OF CONTROLLING LASER WORKING APPARATUS

The present application is based on Japanese Patent Application No. 2006-221297, which was filed on Aug. 14, 2006 and the contents of the application is incorporated herein by reference and to which priority is claimed.

1. Field of the Invention

The present invention relates to a laser working apparatus and a method of controlling a laser working apparatus.

2. Background of the Invention

In recent years, laser working has come to be used in welding utilizing a robot. As a welding technique of this kind, a technique is known in which a predetermined welding point is welded with a laser emitting apparatus for emitting a laser beam being attached to the extremity of a robot arm (a manipulator) while a laser beam is moved by moving the robot arm and, at the same time, changing the direction of laser beam emitted from the laser emitting apparatus (for example, refer to Japanese Patent Application Laid-open Publication No. 2005-177862). The welding of this kind has been called "remote welding" since the workpiece and the laser emitting apparatus are more distant from each other than those in conventional welding.

In the case of causing a robot to perform some work, a user teaches the robot a procedure for performing the work, and instructs the robot to memorize the procedure as teaching data (otherwise termed a teaching program). A method of performing such teaching work of robot operations through computer simulation has been termed "off-line teaching" or the like (for example, refer to Japanese Patent Application Laid-open Publication No. 2001-105137).

In the above-mentioned remote welding, movements of the robot and the direction of the laser beam are formed as teaching data by, for example, off-line teaching work as mentioned above, and the teaching data is to be set in a robot control apparatus.

Incidentally, in a case where the off-line teaching is performed, the teaching data obtained through the simulation is not immediately used in manufacturing operations after being implemented into actual equipment, but checked through a test operation performed by the equipment whether the equipment can be operated as intended.

In the remote welding, however, a laser emitting apparatus and a workpiece are distanced from each other unlike a welding gun by which welding is performed in proximity to a workpiece as has been conventionally performed. This has made it difficult to determine, in the test operation performed by the actual equipment, whether or not the robot and the mirror operates such that a laser beam is directed to a desired position on the workpiece, that is, a designed welding point.

OBJECT OF THE INVENTION

Consequently, an object of the present invention is to provide a laser working apparatus that is easier to check a laser-beam target position at the time of checking instruction operations in a case where the laser emitting apparatus and the workpiece are distanced from each other. Another object is to provide a method of controlling a laser working apparatus.

SUMMARY OF THE INVENTION

According to one aspect of the present invention, there is provided a laser working apparatus comprising: a laser head provided with a reflector; a laser oscillator configured to output a laser beam for welding and a visible beam, the laser oscillator being connected to the laser head in such a way that one of the laser and visible beams is inputted to the laser head; a mover configured to move the laser head, the mover having the laser head attached thereto; and a controller configured to control the mover so as to move the laser head in accordance with a previously taught movement route, and configured to also control the laser oscillator and laser head in such a way that the laser oscillator outputs the laser beam and the laser beam inputted to the laser head irradiates a work piece in a predetermined working pattern. The controller comprises a working position checking controller configured to control the mover so as to move the laser head in accordance with the previously taught movement route, and configured to also control the laser oscillator and laser head in such a way that the laser oscillator outputs the visible beam and the visible beam inputted to the laser head irradiates the work piece in a checking pattern indicating a reference position for the predetermined working pattern. The working position checking controller is provided with two alternative modes, the two alternative modes including a central position mode in which the visible beam irradiates the work piece at a central position of the predetermined working pattern and a working pattern mode in which the visible beam irradiates the work piece in a same pattern as the predetermined working pattern.

According to another aspect of the present invention, there is provided a laser working apparatus comprising: a laser head provided with a reflector, the reflector being configured to change a direction of an input beam; a laser oscillator configured to output a laser beam for welding and a visible beam, the laser oscillator being connected to the laser head in such a way that one of the laser and visible beams is inputted to the laser head as the input beam; a mover configured to move the laser head, the mover having the laser head attached thereto; and a controller. The controller has a work mode for welding in which the controller causes the mover to move the laser head in accordance with a movement route previously taught, causes the laser oscillator to set, as the input beam, the laser beam for welding, and controls the laser head to move the reflector in such a way that the laser beam for welding irradiates a work piece in a predetermined working pattern. The controller has a test mode for checking the movement route previously taught in which the controller causes the mover to move the laser head in accordance with the movement route previously taught, causes the laser oscillator to set, as the input beam, the visible beam, and controls the laser head to stop movement of the reflector in such a way that the visible beam irradiates the work piece at a reference position for the predetermined working pattern.

DETAILED DESCRIPTION OF THE PREFERRED EMBODIMENT

An embodiment to which the present invention is applied will be described in detail below with reference to the accompanying drawings.

Figure 1:
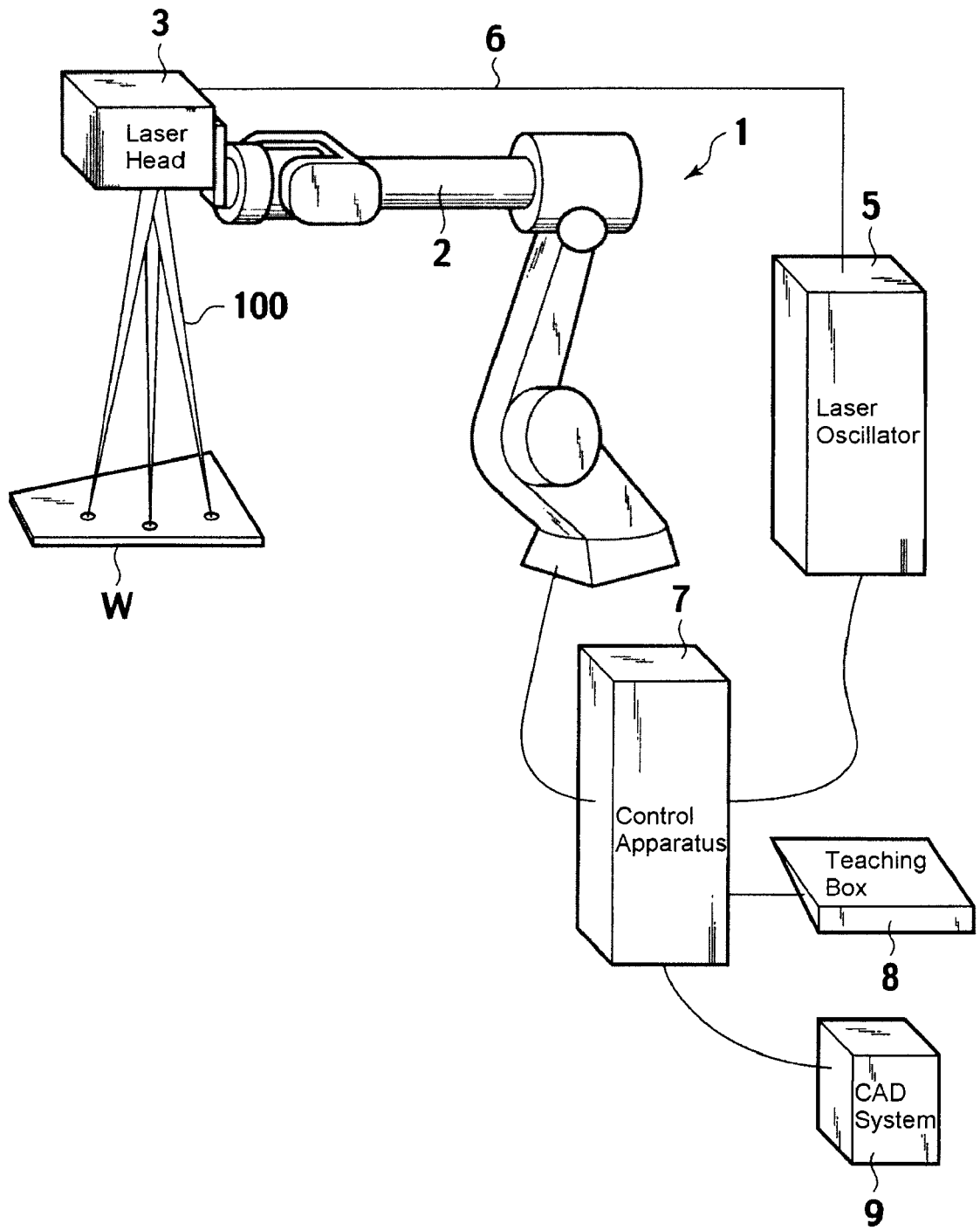
FIG. 1 is a schematic configuration diagram of a laser welding system to which the present invention is applied.
Figure 3:
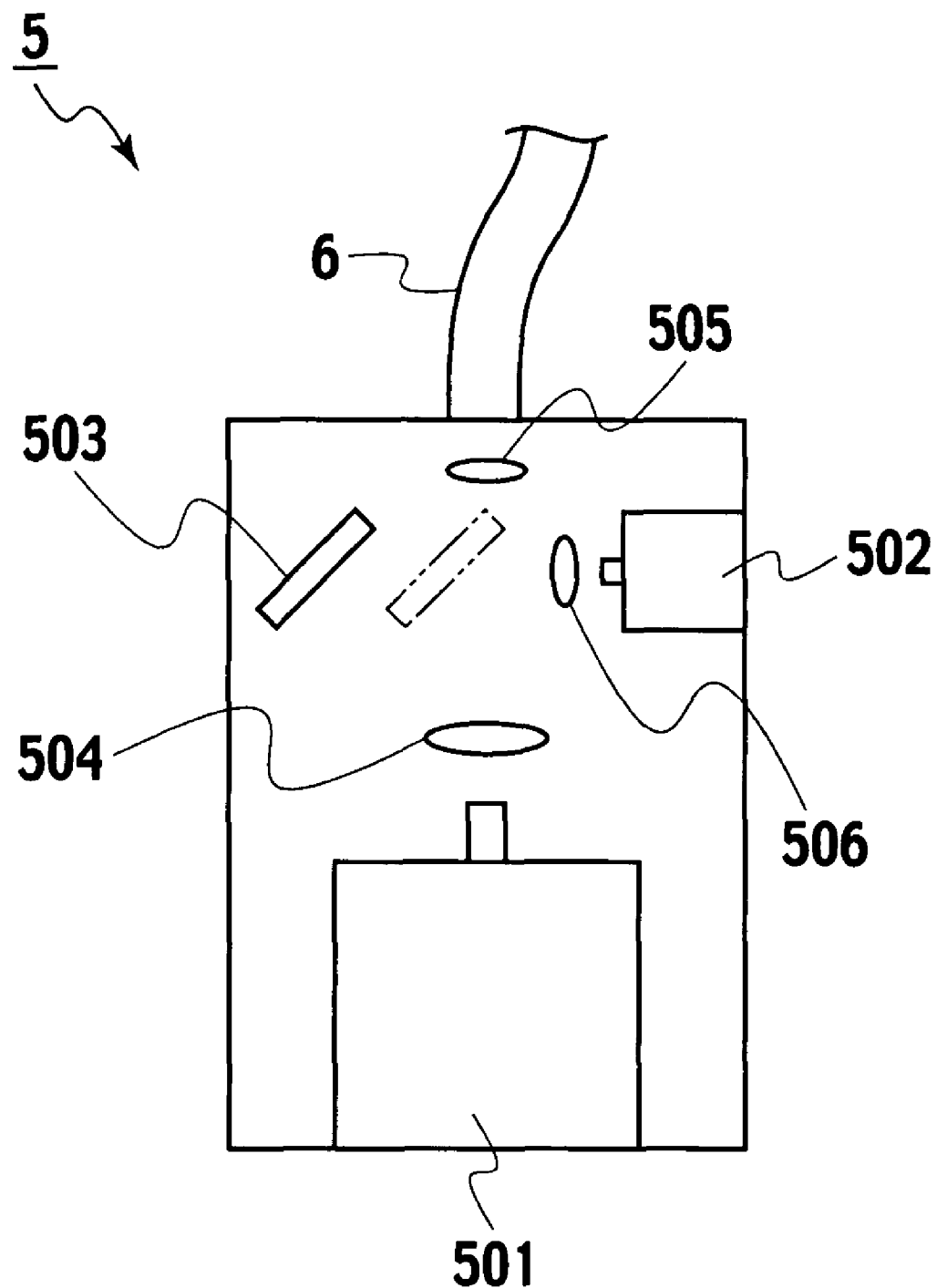
FIG. 3 is an internal structure diagram of a laser oscillator described in FIG. 1.

FIG. 1 is a schematic configuration diagram of a laser working apparatus in the form of a laser welding system to which the present invention is applied; Fig, 2 is an internal structure of a laser head in the laser welding system; and FIG. 3 is an internal structure diagram of a laser oscillator in the laser welding system.

The laser welding system shown in FIG. 1 is configured to irradiate a work piece W with a laser beam 100 from a laser head 3 positioned above the work piece W, and thereby perform welding of the work piece W, which is a welded object provided as an object of the working, without coming in contact with the work piece W directly.

The illustrated laser welding system is composed of the following: a robot 1 (the mover); a laser head 3 which is attached to the extremity of an arm 2 of the robot 1, and which outputs the laser beam 100; a laser oscillator 5 which generates the laser beam; an optical fiber cable 6 which guides the laser beam from the laser oscillator 5 to the laser head 3; a robot control apparatus 7 (the working controller and the working position checking controller) which controls operations of the robot 1 and the laser head 3; a teaching box 8 which sends various instructions to the robot control apparatus 7; and a CAD system 9 which sends CAD data to the robot control apparatus 7.

The robot 1 is a commonly used multi-axis robot, and is capable of moving the laser head 3 to various three dimensional positions and directions by having the arm 2 driven in accordance with the route data provided by teaching work. A YAG laser is used for the laser oscillator 5, and the laser beam generated by the laser oscillator 5 is guided to the laser head 3 through the optical fiber cable 6. The laser head 3 reflects the guided laser beam by a reflecting mirror 11 embedded therein, and scans a working point (termed as a welding point hereinafter) on the work piece W with the intensive laser beam 100. The laser beam 100 is directed to the working point, and welding of the working point (formation of the welding heads) is then carried out in accordance with the shape scanned by the laser head 3.

The robot control apparatus 7 controls operations of the robot 1 while recognizing the positions of the robot 1, and also, controls the laser head 3 (the reflecting mirror 11) so as to change the direction of laser beam. Additionally, the robot control apparatus 7 controls ON/OFF of the laser output from the laser oscillator 5.

By obtaining the CAD data from the CAD system 9, the robot control apparatus 7 can also grasp which part of the area on the work piece W the laser head 3 should irradiate the work piece W with the laser beam 100.

Figure 2:
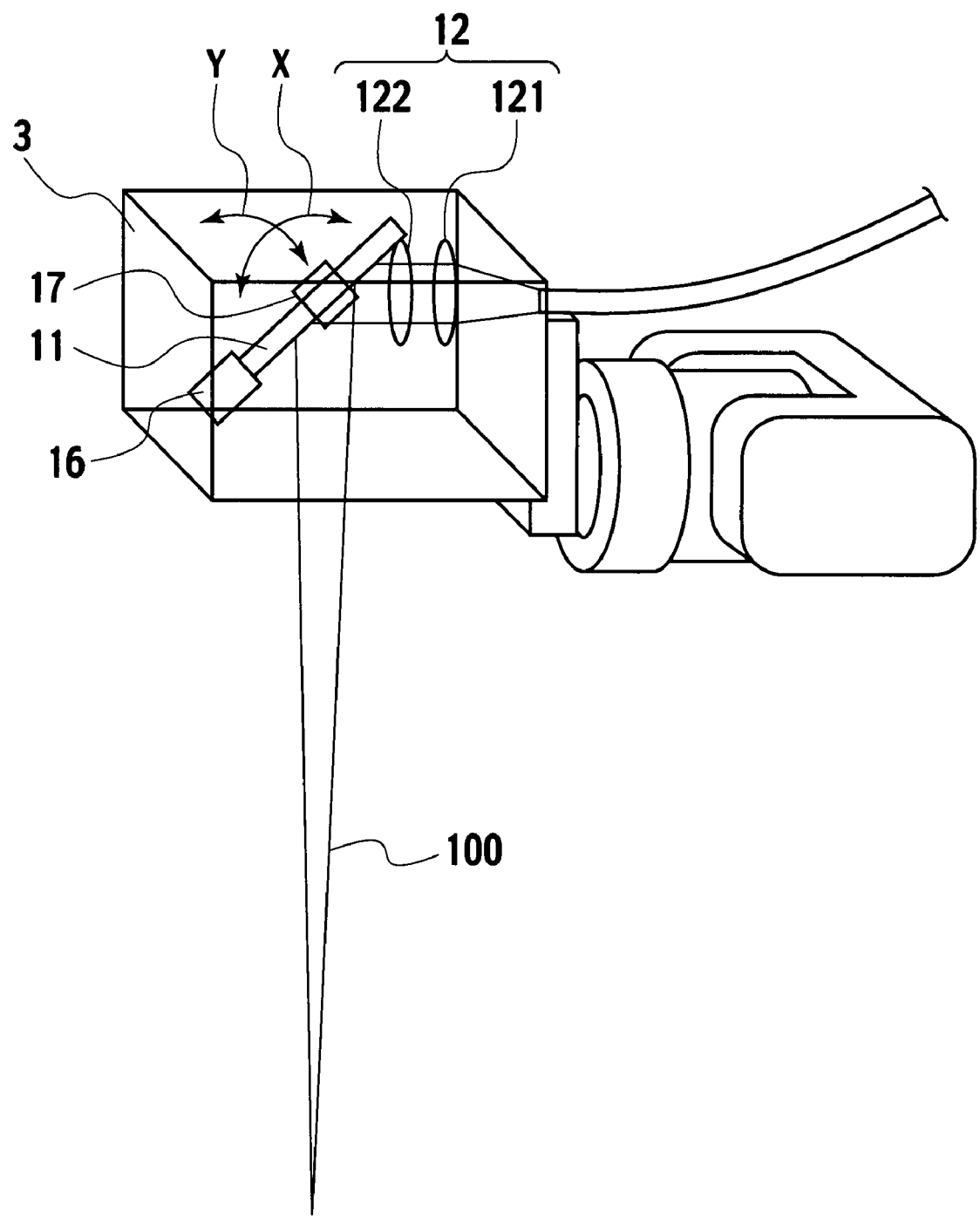
FIG. 2 is an internal structure diagram of a laser emitting apparatus described in FIG. 1.

The laser head 3 is capable of changing the direction of one of a laser beam and a visible laser beam (a visible beam) which have been inputted thereto. That is, as shown in FIG. 2, the laser head 3 includes: the reflecting mirror 11 (the reflector) for directing the laser beam 100 guided through the optical fiber cable 6 to the welding point; motors 16 and 17 which deflect the reflecting mirror 11; and a lens group 12.

An axis line passing through the mirror surface of the reflecting mirror 11 and perpendicular to the mirror surface is set as a Z-axis, while the axes orthogonal to the Z-axis are defined as an X-axis and a Y-axis. The reflecting mirror 11 is supported so as to freely rotate independently around the X-axis and around the Y-axis. The motors 16 and 17 change the direction of the reflecting mirror 11 in a three-dimensional direction by synthesis of rotating positions of the respective motors. Accordingly, the reflecting mirror 11 is arranged in such a way that a laser beam incident from the optical fiber cable 6 can be freely oriented in a three-dimensional direction. By rotating the reflecting mirror 11 in a three-dimensional direction, the laser head 3 can irradiate the work piece W with the laser beam in a scanning pattern (a working pattern) corresponding to a predetermined shape on the welding point set on the work piece W.

In a case where a below-mentioned visible laser beam is inputted to the laser head 3 in place of a laser beam for welding, the laser head 3 can irradiate various patterns (checking patterns) with the inputted visible laser beam in the same manner as described above.

The lens group 12 is composed of: a collimating lens 121 for making a laser beam into parallel rays, the laser beam having been emitted from an end portion of the optical fiber cable 6; and a condensing lens 122 for condensing, on the work piece W, the laser beam 100 having been made into the parallel rays. Thus, the laser head 3 is required to maintain the distance to the work piece W so that the distance from the welding point to the reflecting mirror 11 falls within a certain range.

Inside the laser oscillator 5, a visible-laser beam oscillation source 502 is provided in addition to a YAG laser oscillation source 501 as shown in FIG. 3. The visible laser beam oscillation source 502 is, for example, a semiconductor laser. The visible laser beam is not specified as long as it has a wavelength range visible to human eyes. Accordingly, any one of various visible laser beams including ones of short wavelengths, such as a red beam and a green beam, and a white beam can be utilized. Additionally, a visible laser beam is preferable because of an excellent rectilinear propagation thereof. Incidentally, a normal visible light outputted from a light emitting diode may be substituted for the visible laser beam.

A switching mirror 503 inside the laser oscillator 5 can switch between the case of outputting a YAG laser beam to the optical fiber cable 6 and the case of outputting the visible laser beam (the visible light) to the optical fiber cable 6. That is, the YAG laser beam is outputted to the optical fiber cable 6 when the switching mirror 503 is located at the solid line, and the visible laser beam is outputted to the optical fiber cable 6 when the switching mirror 503 is located at the dotted line.

The switching mirror 503 is switched by an instruction from the robot control apparatus 7, or manually, and is switched so that the YAG laser can be outputted when laser welding is to be applied, or so that the visible laser beam can be outputted at the time of test operation. Incidentally, inside the laser oscillator 5, provided are lens systems 504 to 506, which are necessary to guide any one of the YAG laser beam and the visible laser beam to the switching mirror 503 and to the optical fiber cable 6, according to need.

Figure 4:
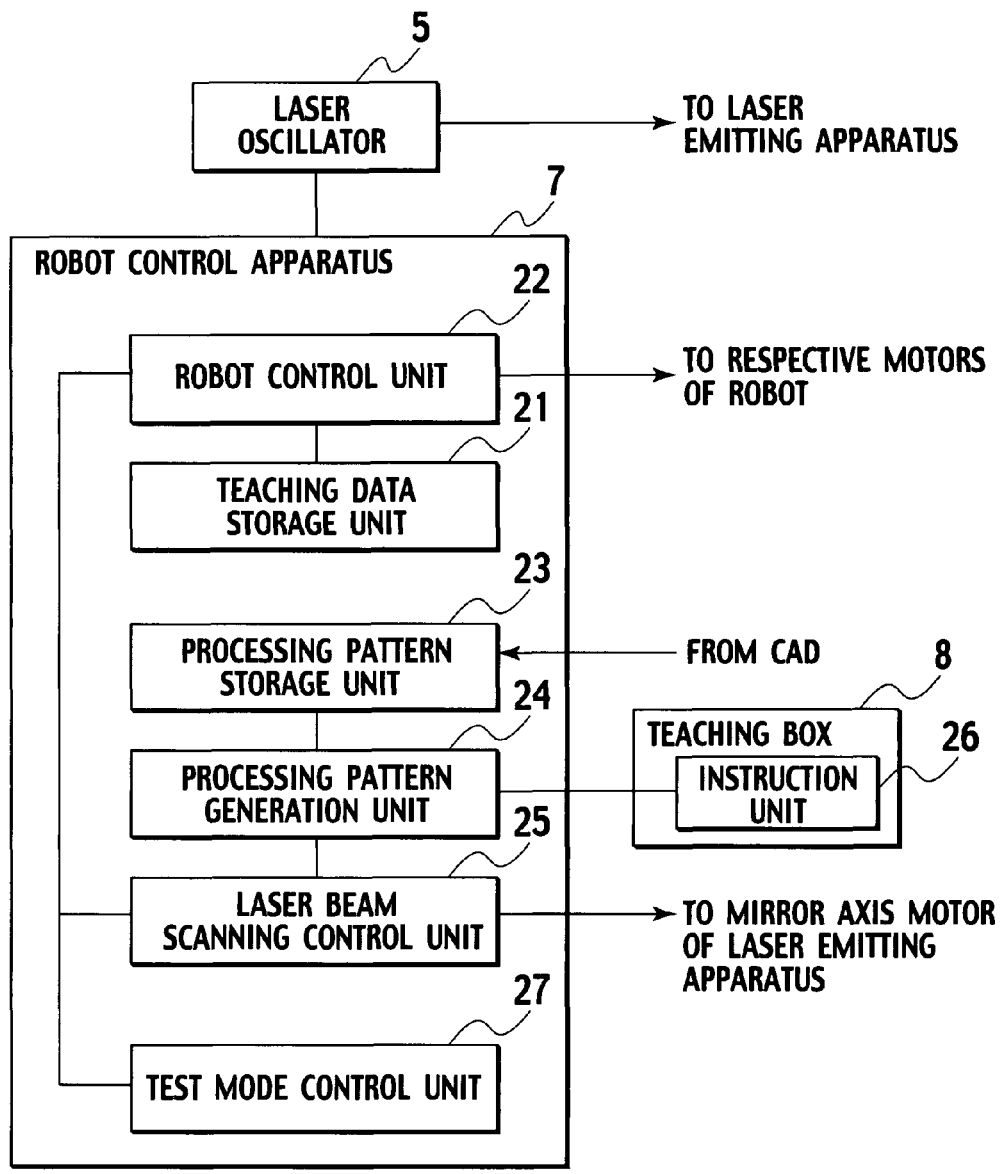
FIG. 4 is a block diagram showing a control system of a laser welding system according to an embodiment of the present invention.

FIG. 4 is a block diagram illustrating a control system of the laser welding system according to this embodiment.

The robot control apparatus 7 is provided with a teaching data storage unit 21, a robot control unit 22, a working pattern storage unit 23, a working pattern generation unit 24, and a laser beam scanning control unit 25 and a test mode control unit 27.

The teaching data storage unit 21 stores an operation route and an operation speed of the robot 1, and a welding point on the work piece W, which are previously taught through teaching work in a simulation utilizing a CAD system. The welding point indicates a welding position on the work piece W, and is expressed on a three-dimensional coordinate. Incidentally, instead of teaching data obtained through a simulation, teaching data obtained by using actual equipment may be used.

The robot control unit 22 controls rotation of the respective axis motors of the robot 1 based on the teaching data, and thereby controls the laser head 3 so as to move in accordance with the predetermined operation route, and to sequentially stop at given positions, which are, for example, predetermined positions above the welding points set on the work piece W. The robot control unit 22 is configured also to recognize the position of the robot 1 based on the rotation number (encoder number) of the respective axis motors. Thus, the robot control unit 22 functions as a position recognition unit which recognizes a position of the robot 1 as well. Furthermore, the robot control unit 22 also has a function of judging, based on the recognized position of the robot 1, whether or not the laser head 3 is located at a position from which a laser beam can be oriented to a certain welding point on the work piece W.

Figure 5:
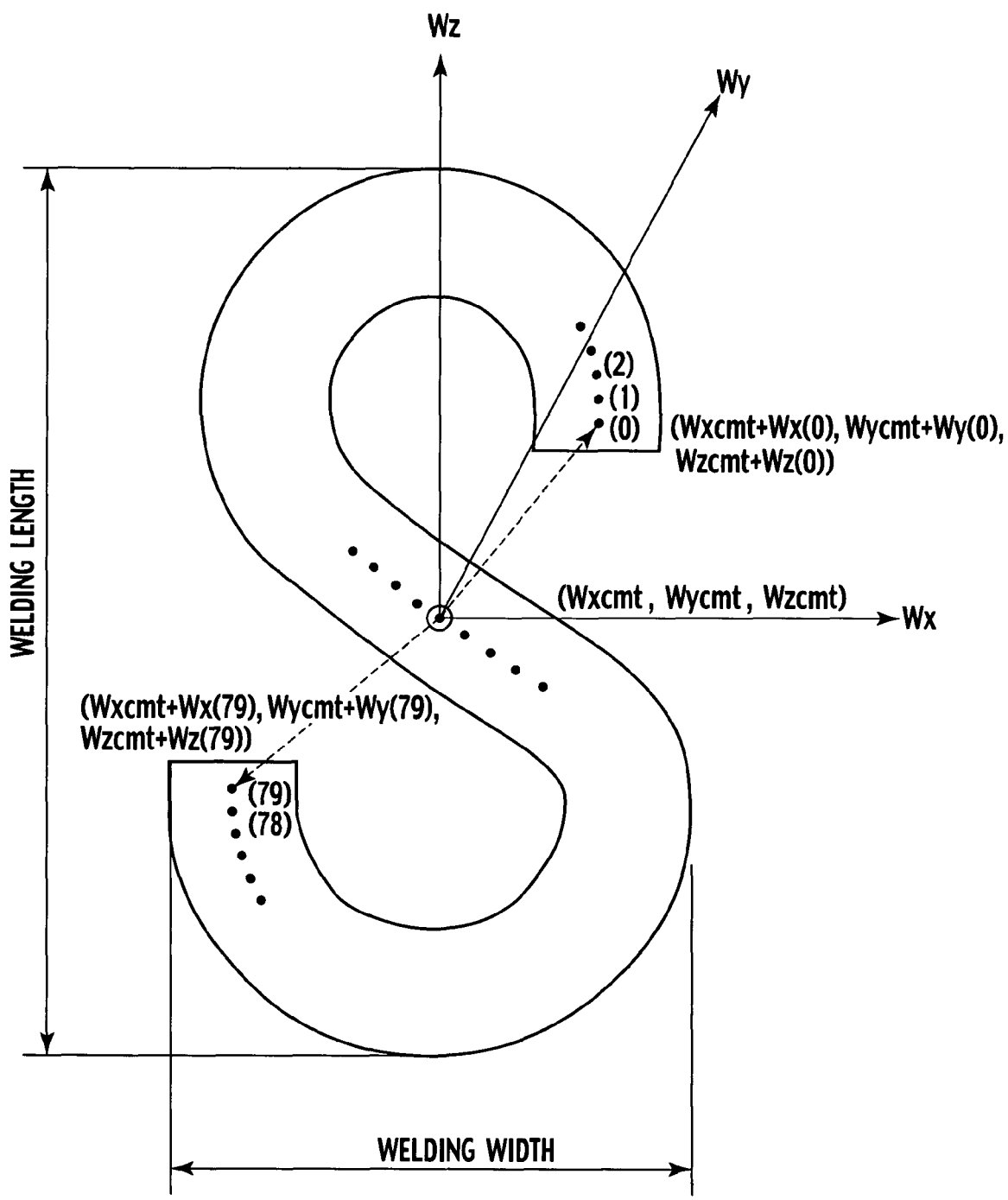
FIG. 5 is an illustration showing one example of a shape of a working pattern used in the embodiment.
Figure 6:
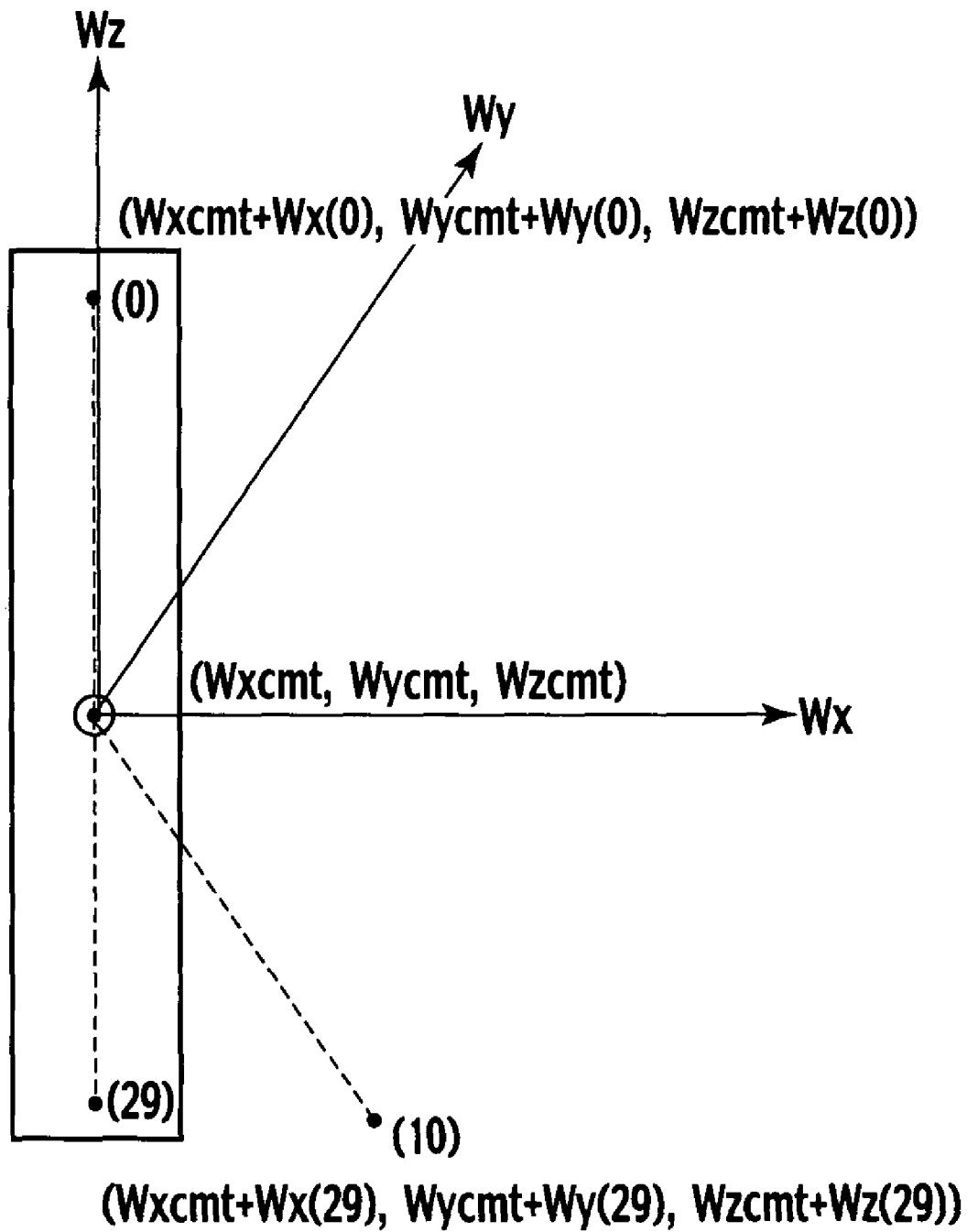
FIG. 6 is an illustration showing another example of shape of the working pattern used in the embodiment.
Figure 7:
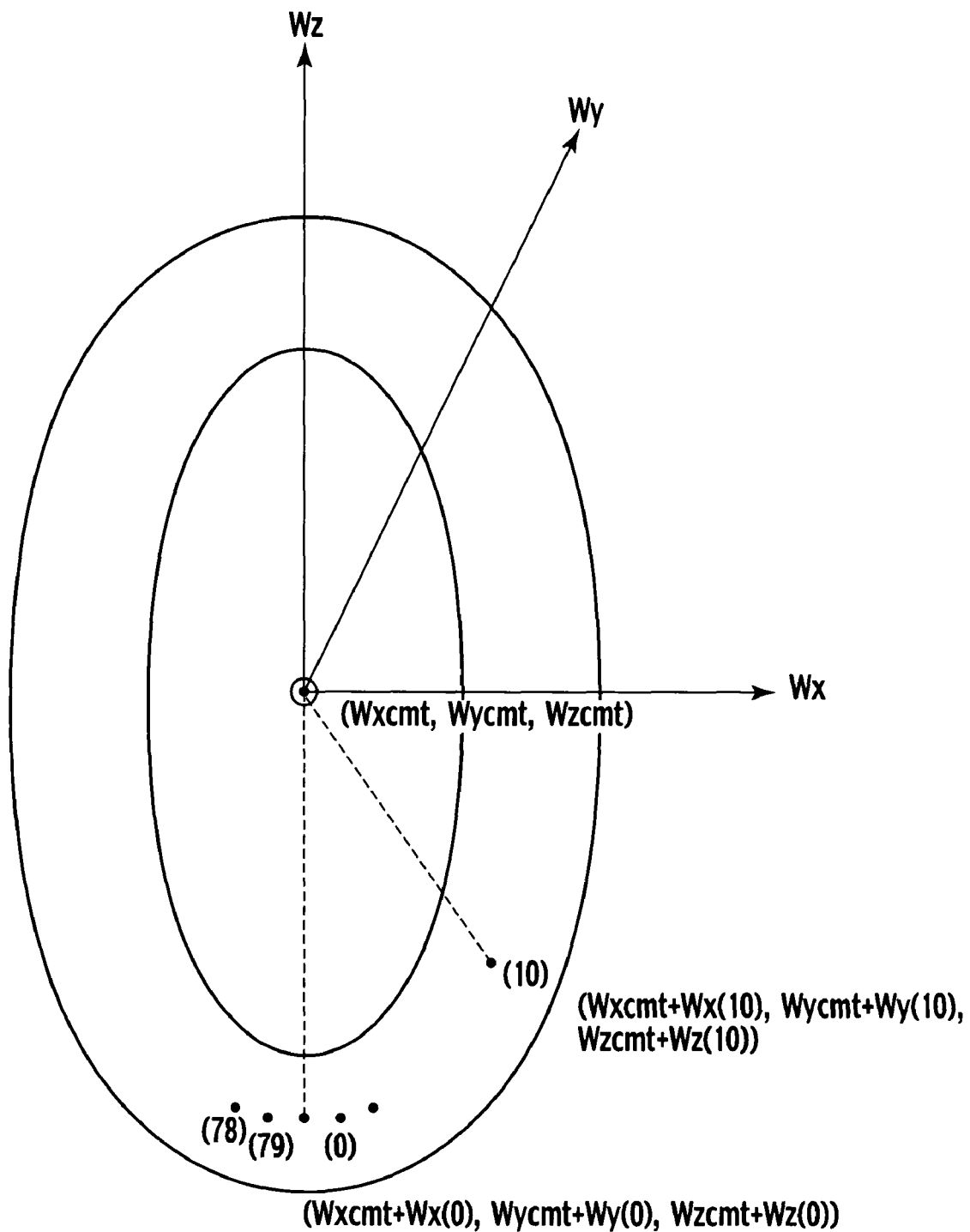
FIG. 7 is an illustration showing still another example of shape of the working pattern used in the embodiment.

The working pattern storage unit 23 is a storage unit which stores the scanning pattern (the working pattern) scanned by the laser head 3 with the laser beam 100. The scanning pattern stored in the working pattern storage unit 23 may have any shape of any size. In this embodiment, an S-shaped working pattern shown in FIG. 5 is stored, for example. A size of such an S-shaped working pattern is defined as longitudinal and lateral dimensions expressed, for example, respectively as a length (a welding length) of certain millimeters and a width (a welding width) of certain millimeters. Incidentally, although descriptions, in this embodiment, are given with respect to a case where the working pattern is an S-shaped pattern, the working pattern may be a bar-shaped pattern as shown in FIG. 6, or may be a circle-shaped pattern as shown in FIG. 7. Incidentally, because the working pattern is generated by CAD, data from CAD are stored in the working-pattern storage unit 23.

A method of expressing the working pattern will now be described. The working pattern is composed of: the central coordinate of the welding point which is given within the working pattern; and a sequence of plural coordinate points each defined by an offset amount from the central coordinate point of the welding point. The central coordinate point of the welding point and the sequence of coordinate points are expressed as coordinates in the same coordinate system as the work piece W.

For example, in a case where the working pattern is an S-shaped pattern as shown in FIG. 5, the welding length and the welding width of the S-shaped pattern is defined as shown in the drawing. The same coordinate system (Wx, Wy, Wz) as is defined for the work piece W is defined by having a barycenter of the S-shaped pattern as the central coordinate point (Wxcnt, Wycnt, Wzcnt) of the welding point, and by having the central coordinate point of the welding point as the origin of the coordinate system. A sequence of 80 coordinate points from (Wxcnt +Wx(0), Wycnt +Wy(0), Wzcnt +Wz(0)) to (Wxcnt +Wx(79), Wycnt +Wy(79), Wzcnt +Wz(79)) are then defined as offset amounts (vector quantities shown by dotted lines in the drawing) from the central coordinate point of the welding point. These offset amounts expressed as vectors indicate how distant the respective points are from the central coordinate point of the welding point. Incidentally, each of the offset amounts can be defined as a two-dimensional offset amount, and can also be defined as a three-dimensional offset amount.

In a case where the working pattern is a bar-shaped pattern as shown in FIG. 6, the same coordinate system (Wx, Wy, Wz) as the work piece W is defined by having a barycenter of the bar-shaped pattern as the central coordinate point (Wxcnt, Wycnt, Wzcnt) of the welding point, and by having the central coordinate point of the welding point as an origin of the coordinate system. A sequence of 30 coordinate points from (Wxcnt +Wx(0), Wycnt +Wy(0), Wzcnt +Wz(0)) to (Wxcnt +Wx(29), Wycnt +Wy(29), Wzcnt +Wz(29)) are then defined as offset amounts (vector quantities shown by dotted lines in the drawing) from the central coordinate point of the welding point.

In a case where the working pattern is a ring-shaped pattern as shown in FIG. 7, the same coordinate system (Wx, Wy, Wz) as the work piece W is defined by having a barycenter of the circle-shaped pattern as the central coordinate point (Wxcnt, Wycnt, Wzcnt) of the welding point, and by having the central coordinate point of the welding point as an origin of the coordinate system. A sequence of 80 coordinate points from (Wxcnt +Wx(0), Wycnt +Wy(0), Wzcnt +Wz(0)) to (Wxcnt +Wx(79), Wycnt +Wy(79), Wzcnt +Wz(79)) are then defined as offset amounts (vector quantities shown by dotted lines in the drawing) from the central coordinate point of the welding point.

While the working pattern stored in the working-pattern storage unit 23 is generated by the CAD system 9 (refer to FIG. 1) as the welding point is, the welding point and the working pattern are taught individually and independently by the CAD system 9. That is, the welding point and the working pattern can be treated as data totally different from each other. For this reason, the teaching data storage unit 21 and the working pattern storage unit 23 are provided independently.

The working pattern generation unit 24 is configured to generate an S-shape having the size as stored in the working-pattern storage unit 23 based on the S-shape of the working pattern stored in the working-pattern storage unit 23, or to generate an S-shape having a size prescribed by an instruction unit 26 of the teaching box 8.

The laser beam scanning control unit 25 inputs the S-shaped working pattern having the size generated by the working pattern storage unit 23. At the same time, the laser beam scanning control unit 25 calculates an S-shaped sequence of coordinate points (about 80 points) to be irradiated on the welding point in consideration of the position of the robot 1 recognized by the robot control unit 22, and deflects the reflecting mirrors 11 of the laser head 3 based on the S-shaped series of coordinate points. Furthermore, the laser beam scanning control unit 25 also has a function of converting, into coordinates in the coordinate system of the robot 1, the central coordinate point for the working pattern, and the series of the plurality of coordinate points each expressed as an offset amount from the central coordinate point, both of which are expressed as coordinates in the coordinate system of the work piece W.

The instruction unit 26 is configured to give instructions of a size of the working pattern for the welding point on the work piece W. The instruction unit 26 gives instructions of the size in accordance with, for example, welding strength required for the welding, for example, a length and a width of the S-shaped working pattern being respectively three-times as large as a length of the S-shaped working pattern stored in the working pattern storage unit 23, and 1.5 times as large as a width thereof. Incidentally, instead of being instructed by the instruction unit 26, the size of the working pattern may be previously embedded in a program which is loaded when the laser welding is applied.

At the time of operations of a test mode, the test mode control unit 27 controls the robot control unit 22 and the laser oscillator 5 by setting them under the test mode, and thereby emits a visible laser beam onto the work piece W.

In this embodiment, two types of test modes are available as the test modes executed by the test mode control unit 27.

A test mode includes two alternative modes. A first one of the test modes is a central position mode in which the visible laser beam is irradiates the work piece W at only a position of the welding point which is stored in the teaching-data storage unit 21. A second one of the test modes is a working pattern mode in which the visible laser beam irradiates the work piece W in the above mentioned working pattern.

Accordingly, in the central position mode, the work piece W is irradiated in a checking pattern indicating only the central position of the working pattern with the visible beam. In this case, the checking pattern may employ any one of various shapes including, for example, a dot shape which is the same as a spot shape of the visible laser beam; a circle shape slightly larger than the spot shape; an X-shape (an x mark) where the central position of the working pattern is positioned at the intersection of X; and furthermore, an encircled x mark. A shape that can be easily recognized by a user is to be selected, as appropriate, from among the various shapes, and then to be stored as the checking pattern in advance so that the test mode control unit 27 can use the selected shape.

On the other hand, in the working pattern mode, when the working pattern is, for example, the S-shaped pattern, the work piece W is irradiated with the visible beam in accordance with the sequence of coordinate points (about 80 points) constituting the shape of S.

Incidentally, in the central position mode and working pattern mode, the test mode control unit 27 instructs the laser oscillator 5 to output the visible laser beam. Thereby, the laser oscillator 27 starts oscillation of the visible beam oscillation source 502 to output the visible laser beam by completely stopping oscillation of the YAG laser oscillation source 501, and, at the same time, by moving the switching mirror 503 to the visible beam outputting position (the position indicated by the dotted line in FIG. 3).

Being extended operations of the teaching operations, instructions in the test modes are executed by input from the instruction unit 26 of the teaching box 8.

Figure 8:
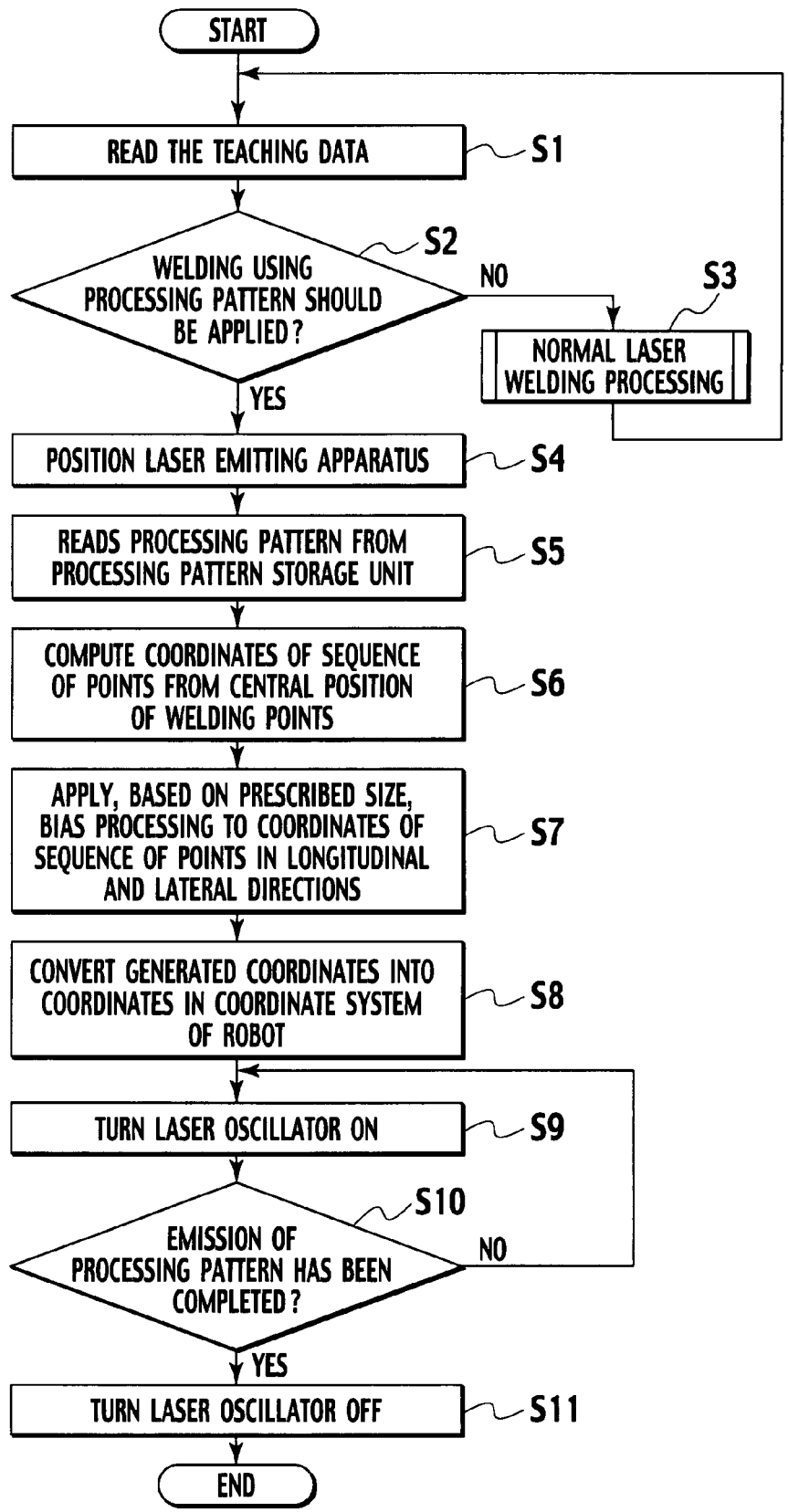
FIG. 8 is a flowchart showing an operation procedure at the time of laser welding according to the embodiment.

Next, an operation working procedure of the robot control unit at the time of laser welding will be described in detail based on the flowchart shown in FIG. 8.

A basic operation of the robot control unit 22 at the time of laser welding includes: stopping the robot at a taught position; conducting, at that position, the laser welding at one welding point that is irradiated by the laser head 3; and, when the laser welding should be conducted at the next welding point, moving the robot further to the next taught position to carry out the laser welding. By repeating the basic operation, the robot control unit 22 sequentially conducts the laser welding at all of the welding points one after another, and as a result, the laser welding is completed for all of the welding points.

First, the robot control unit 22 reads the teaching data for the laser welding (S1). The teaching data includes description of, for example, a robot stop position, an operational speed, the central coordinate point of a welding point, a working pattern, a welding length, a welding width and other operational instructions required for control, and the robot operates in accordance with the teaching data.

Next, the robot control unit 22 judges whether or not welding using the working pattern stored in the working-pattern storage unit 23 should be conducted. This judgment can be made by finding whether or not the teaching data contain a description for conducting the welding by retrieving the working pattern (S2). If the thus read teaching data does not contain this description on the working pattern, the robot is not instructed to conduct the welding using the working pattern (NO in S2), and thereby conducts normal laser welding (S3). Detailed description on this normal laser welding (S3) is hereby omitted since this welding does not directly relate to the present invention.

The robot control unit 22 causes the robot 1 to operate in accordance with the teaching data, in such a way that the robot 1 moves the laser head 3 at the operational speed described in the teaching data, and positions the laser head 3 at the robot stopping position. At the same time, the robot control unit 22 positions the reflecting mirror 11 of the laser head 3 toward one welding point on the work piece W (S4). Specifically, the direction of the reflecting mirror 11 is adjusted to orient a laser beam to the central coordinate point of the welding point. From this position, the laser head 3 can orient the laser beam to the specific welding point.

The working-pattern generation unit 24 reads the working pattern from the working pattern storage unit 23 (S5). In this embodiment, the S-shaped working pattern shown in FIG. 5 is read.

In order to irradiate the work piece W in the working pattern for the welding point, the working pattern generation unit 24 computes coordinates of the respective 80 points of the working pattern based on the central coordinate point of the welding point, the welding width and the welding length which are described in terms of the coordinate system of the work piece W, and have been read (or are stored in the working-pattern storage unit 23) (S6).

Next, the working pattern generation unit 24 shifts the thus computed 80 coordinate points of the working pattern in the longitudinal direction (the direction of the welding length) and in the lateral direction (the direction of the welding width) in accordance with the "welding width" and the "welding length" which are described in the teaching data having been read, in a biasing process during which the working pattern having a required size is generated (S7).

The laser beam scanning control unit 25 converts the 80 coordinate points of the thus generated working pattern from the coordinate system of the work piece into the coordinate system of the robot 1. At the same time, the laser beam scanning control unit 25 inputs the position of the robot 1 recognized by the robot control unit. The laser beam scanning control unit then computes data used for welding in an intended manner (the angle of the reflecting mirror 11 at each of times from the start of rotation to the end of rotation) of rotating the reflecting mirror 11 for drawing the working pattern having the required size on the welding point of the work piece W, the welding point being set as a target with the current position of the robot 1 (S8).

Upon completion of the abovementioned computation, the robot control unit 7 instructs the laser oscillator 5 to output a laser beam (a YAG laser beam) in accordance with the teaching data (the laser oscillator is turned ON in S9). When the laser oscillator 5 is turned ON, the laser beam is emitted toward the reflecting mirror 11, and the reflecting mirror 11 then rotates as calculated.

The laser beam scanning control unit 25 judges whether or not the rotation of the reflecting mirror 11 (or the emission of the working pattern) has been completed (S10). When the rotation of the reflecting mirror 11 has not been completed, the laser welding is continued with the laser oscillator 5 being ON (NO in S10), and, when the rotation of the reflecting mirror 11 has been completed (YES in S10), output of the laser beam is stopped by canceling the instruction for outputting the YAG laser from the laser oscillator 5 (the laser oscillator is turned OFF in S11), thereby laser welding is ended.

Emission of the working pattern to the one welding point is completed by the above working. To weld a plurality of welding points, the above working is to be sequentially executed the number of times equal to the number of the welding points.

Figure 9:
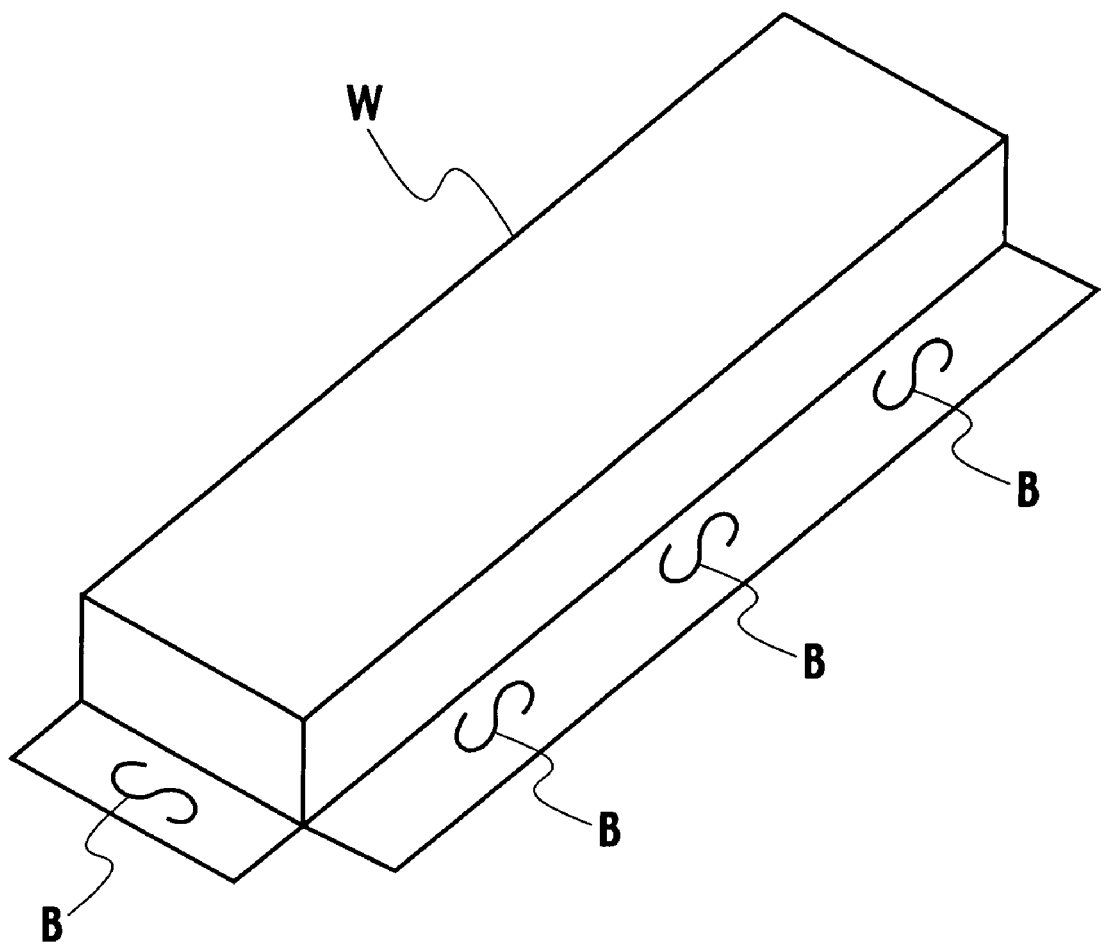
FIG. 9 is an explanatory drawing for explaining welding beads of laser welding according to the embodiment.

Thereby, as shown in FIG. 9, the welding beads B are formed on plural positions of welding points on the work piece W with the working patterns respectively specified (each being S-shaped in this embodiment).

As has been described above, in this embodiment, in the case of welding having a plurality of welding points, the robot control apparatus 7 stores data on the working pattern apart from the teaching data relating to operations of the robot 1. Thereby, laser welding is configured to be applied based on the data on the working pattern after the robot 1 has been positioned in relation to each of the welding points. Accordingly, it is not required to teach the working pattern with respect to each of the welding points. Consequently, a time required for teaching is considerably reduced. Furthermore, a shape of the working pattern can also be changed easily only by changing data stored in the working pattern storage unit 23 when the shape of the working pattern is needed to be changed.

Note that, although the S-shaped pattern is exemplified as the working pattern herein, a shape of the working pattern to use may be selected in accordance with a kind of the work piece by having the above-described bar-shaped and round working patterns also kept stored in the working-pattern storage unit 23. Moreover, a shape of the working pattern may be selected with respect to each of the welding points.

Figure 10:
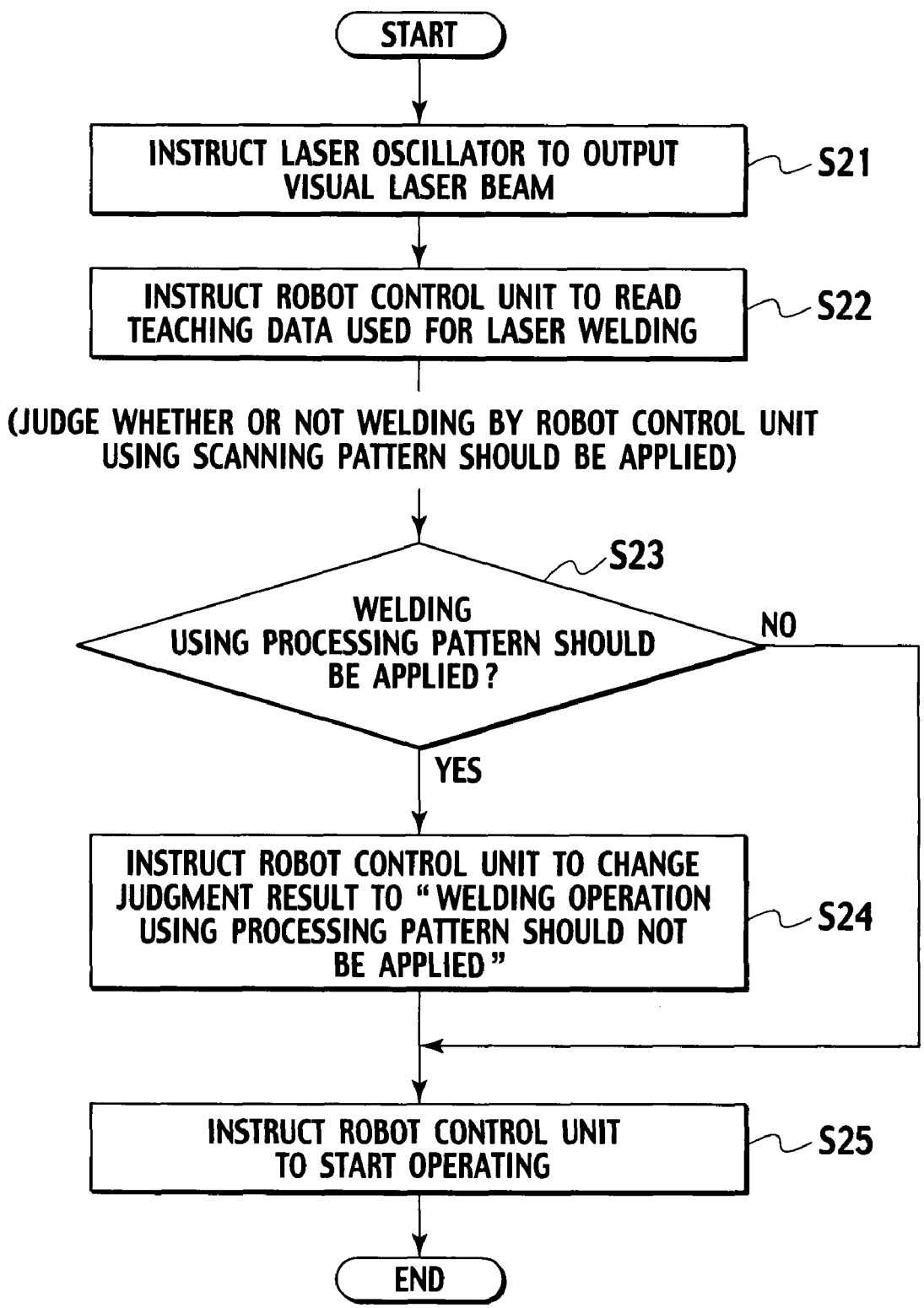
FIG. 10 is a flowchart showing an operation procedure at the time of a central-position mode according to the embodiment.

Next, an operation working procedure of the robot control unit at the time of the central position mode in the test mode will be described in detail based on the flowchart shown in FIG. 10.

A basic operation of the robot control unit 22 at the time of the central position mode includes: stopping the robot 1 at a taught position; keeping a visible laser beam irradiating the work piece W over the same period of time as taken in a case where the welding is conducted for one welding point, which the laser head 3 irradiates with the visible laser beam; and likewise, when there is a next welding point, moving the robot 1 to a next taught position to emit the visible laser beam and repeating the operation.

Execution of the central position mode is firstly started by inputting, from the teaching box 8, an instruction on execution of the central position mode. With this instruction, the laser oscillator 5 and the respective control units in the robot control unit 7 enter the test mode, and operate in accordance with instructions from the test mode control unit 27.

Then, the test mode control unit 27 firstly instructs the laser oscillator 5 to output a visible laser beam (S21). This instruction is set as a mandatory instruction, and, during the test mode, the test mode control unit 27 does not accept the other instructions until this instruction is cancelled. Incidentally, a visible laser beam may be outputted by switching the laser oscillator 5 manually, instead of by the instruction for outputting a visible laser beam from the test mode control unit 27, so that a YAG laser beam is prevented from being emitted whatever instruction is inputted in the laser oscillator 5.

Next, the test mode control unit 27 instructs the robot control unit 22 to read the teaching data for the laser welding. This teaching data is the same as the one used in the control at time of the above described laser welding (S22).

Thereby, the robot control unit 22 comes to judge, based on the thus read teaching data, whether or not to apply the welding using the working pattern stored in the working-pattern storage unit 23 as in the case with the laser welding. Accordingly, the test mode control unit 27 acquires a result of the judgment made by the robot control unit 22 as to whether or not to apply the welding using the working pattern (S23).

When an welding operation using the working pattern is judged to be applied, that is, when the teaching data is judged to contain a description on the working pattern (YES in S23), the test mode control unit instructs the robot control unit 22 to change the result of the judgment made by the robot control unit 22 to "an welding operation using the working pattern is not to be applied" (S24). Thereby, the robot control unit 22 recognizes that the welding operation using the working pattern is not to be applied by having the result of the judgment made by itself changed.

On the other hand, when the result of the judgment made by the robot control unit 22, which has been acquired in step S23, is that the welding using the working pattern is not to be conducted (NO in step S23), the processing advances directly to the next step S25.

Then, in step S25, the test mode control unit 27 instructs the robot control unit 22 to start operating (S25). At this time, although the instruction for outputting the YAG laser beam is executed (S9 mentioned above) along with a progress of operations of the robot control unit 22 in accordance with the teaching data, the laser oscillator 5 never outputs the YAG laser beam even with the instruction for outputting the YAG laser beam because of the mandatory instruction (or the manual switching) provided in step S21.

Then, with the instruction to start operating, the robot control unit 22 causes the robot 1 to operate in the same manner as it normally does, moves the laser head 3 at the operation speed described in the teaching data, and positions the laser head 3 at the robot stopping position. At the same time, the robot control unit 22 positions the reflecting mirror 11 of the laser head 3 toward a welding point on the work piece W. Specifically, the direction of the reflecting mirror 11 is adjusted to orient a visible laser beam to the central coordinate point of the welding point. Consequently, the visible laser beam is oriented to the central coordinate point of the welding point. Thereby, orienting the visible laser beam to the one welding point is completed. In the case of having a plurality of welding points, execution of the above-mentioned processes is repeated the number of times equal to the number of welding points.

In the central-position mode, because the robot control unit 22 reads the same teaching data as the one used when the laser welding is actually conducted, the visible laser beam is oriented only to taught welding points over the same time period as taken for orienting the laser beam to the welding points at the time of irradiating the work piece W with the laser beam.

Next, operations of the robot control unit at the time of the working-pattern mode in the test mode will be described.

In the working pattern mode, operations of the robot 1 and the reflecting mirror 11 may be the same as normal welding operations thereof, and the only difference is that the operations are configured so that the visible laser beam can be emitted.

Accordingly, in the working-pattern mode, the test mode control unit 27 informs the respective units about execution of the test mode, and, after firstly instructing the laser oscillator 5 to output a visible laser beam by a mandatory instruction (or manually), the test mode control unit 27 is supposed to instruct the robot control unit 22 to operate in the same manner as it does in normal welding operations thereof.

Note that, although the instruction for outputting the YAG laser beam is executed during execution of the normal operations of the robot control unit 22 in the working-pattern mode as well, the YAG laser beam is never outputted even if the instruction for outputting the YAG laser beam is provided from the robot control unit 22. This is because the laser oscillator 5 has been firstly switched so as to output the visible laser beam by the mandatory instruction (or manually).

Accordingly, in the working-pattern mode, for a case where the working pattern is used, the laser head 3 irradiates the working pattern on a work piece with the visible laser beam in the same manner as it does at the time of normal laser welding.

Here, effects of the central-position mode and the working-pattern mode will be described.

Figure 11:
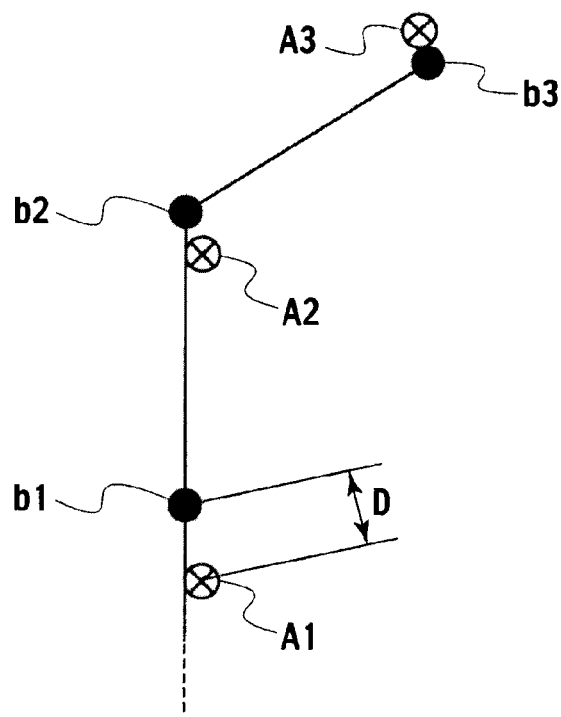
FIG. 11 is a drawing showing a track of a visible laser beam on a work piece in the central-position mode according to the embodiment.
Figure 12:
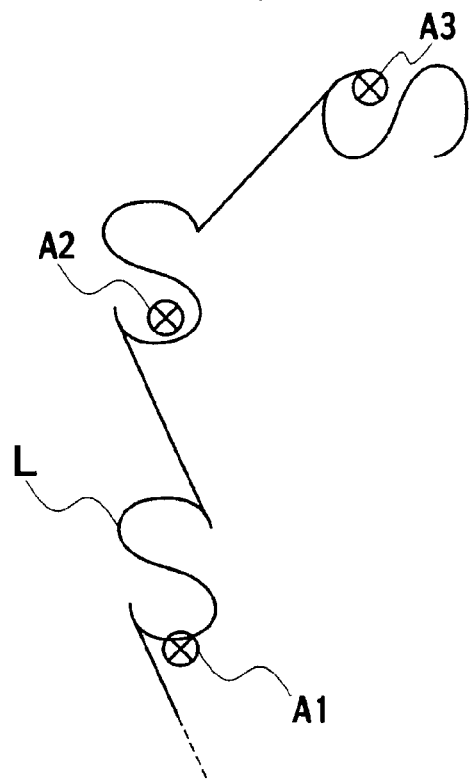
FIG. 12 is a drawing showing a track of a visible laser beam on a work piece in a working-pattern mode according to the embodiment.

FIG. 11 is a drawing showing a track of the visible laser beam on a work piece in the central-position mode. FIG. 12 is a drawing showing a track of the visible laser beam on a work piece in the working-pattern mode. Here, description on both of these cases will be given assuming the case of having a plurality of welding points.

Firstly in the central-position mode, as shown in FIG. 11, the visible laser beam is oriented to taught positions of the welding points by denoting them as points b1 to b3, and accordingly, how much these points deviate from welding-point positions A1 to A3 is clearly recognized. In the case shown in the drawing, how much the central points of the welding points deviate is known with respect to when the teaching data is directly used (the amount of deviation shown in the drawing is D).

In the working-pattern mode, on the other hand, as shown in FIG. 12, in a case where welding beads are formed into an S-shape, the visible laser beam irradiates the work piece W in a working pattern. Accordingly, in a case where the welding beads are formed with the working pattern having a predetermined shape, spread of the welding beads with such a pattern can be checked.

In the working-pattern mode, however, the visible laser beam is not emitted to the positions of the welding points themselves, and as a result, the central positions (or the reference positions) of the working patterns cannot be recognized.

Hence, the central-position mode or the working-pattern mode is preferably to be selected as appropriate according to a purpose of use. For example, preferable manners include that: the central-position mode is selected in the case of checking deviation between designed positions of welding points and taught positions thereof, whereas the working-pattern mode is selected in the case of intending to check spread of welding beads when the welding beads are formed by drawing working patterns.

Furthermore, other effects of the central-position mode and the working-pattern mode will be described.

Figure 13B:
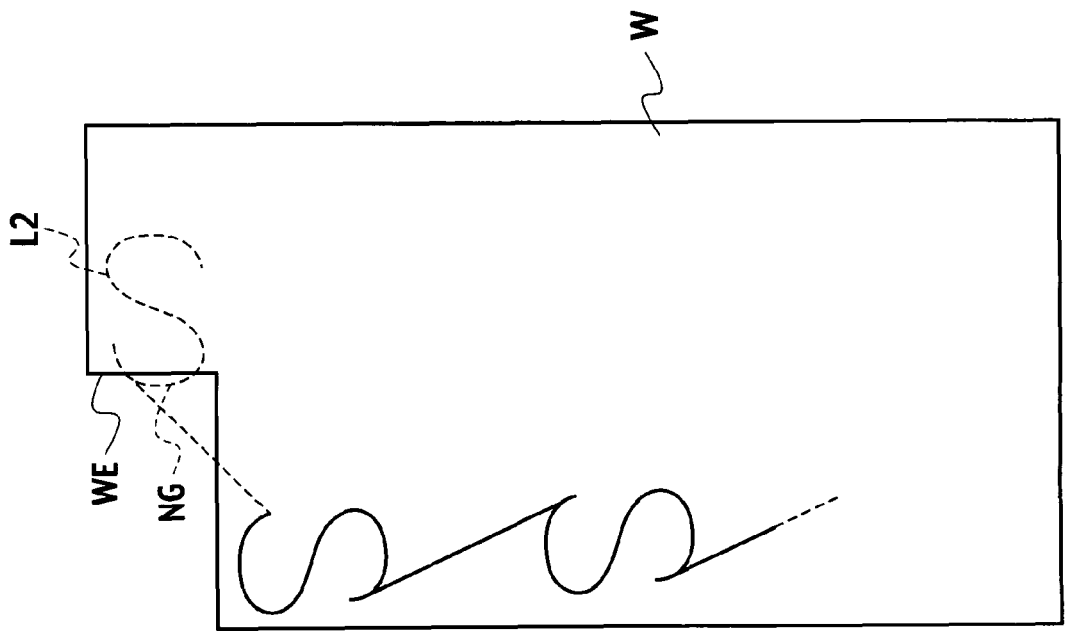
FIGS. 13A and 13B are explanatory drawings for explaining effects of the central-position mode and the working-pattern mode according to the embodiment.
Figure 13A:
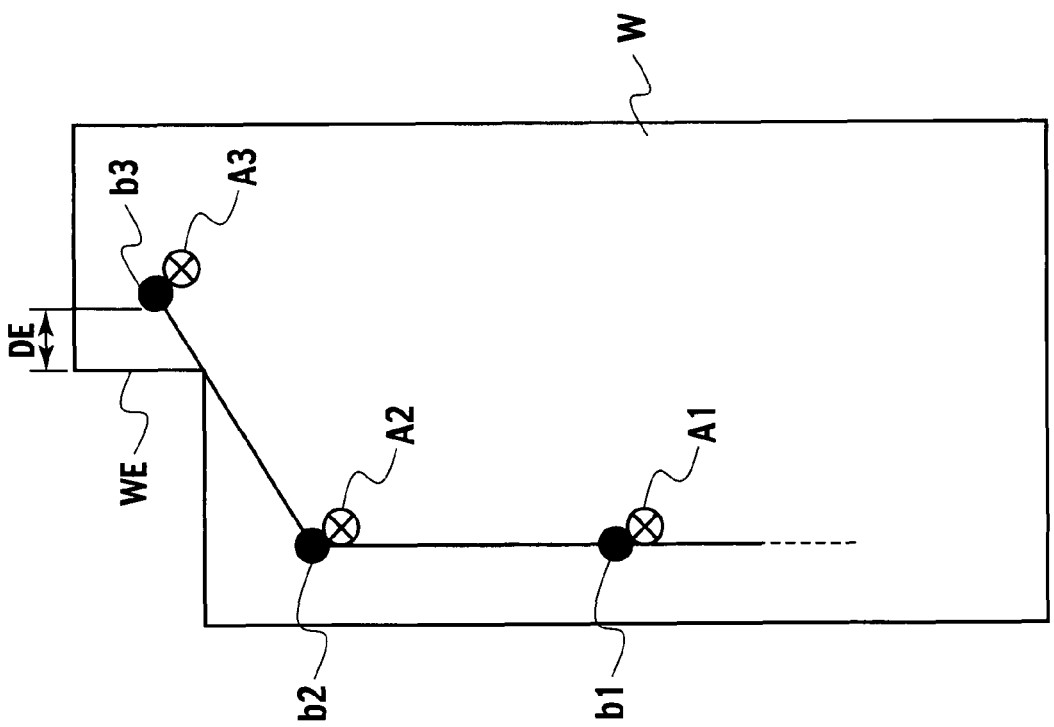

FIGS. 13A and 13B are explanatory drawings for explaining effects of the central-position mode and the working-pattern mode according to this embodiment, and regard to a case example where a welding point is added. Here, a welding point A3 is the added point.

In the central position mode, as shown in FIG. 13A, by having a welding point added in the teaching data so that the welding point can be added, the position of that welding point A3 on the work piece W is irradiated on an "as-is" basis with a visible laser beam b3. Thereby, whether the position of the added welding point is at the designed position on the work piece W can be easily determined. For example, it becomes easier to check how distant the added welding point A3 is from an end WE of the work piece (DE shown in the drawing). Accordingly, by checking whether or not the value of the distance DE is the same as a designed distance from the end WE of the work piece to the welding point A3, it becomes possible to determine, without reproducing the working pattern, whether or not formation of welding beads can be performed as designed in the case of applying welding by use of the working pattern.

On the other hand, in the working-pattern mode, as shown in FIG. 13B, a working pattern L2 is drawn as a predetermined working pattern thereof by the visible laser beam by setting the added welding point at the center of the working pattern L2. Accordingly, in a case where welding as specified by the working pattern is applied to the added welding point, the manner of the spread with which the welding beads are formed can be recognized. In the example shown in the drawing, the working pattern lies off (NG shown in the drawing) the end WE of the workpiece.

Furthermore, still other effects of the central-position mode and the working-pattern mode will be described.

Figure 14B:
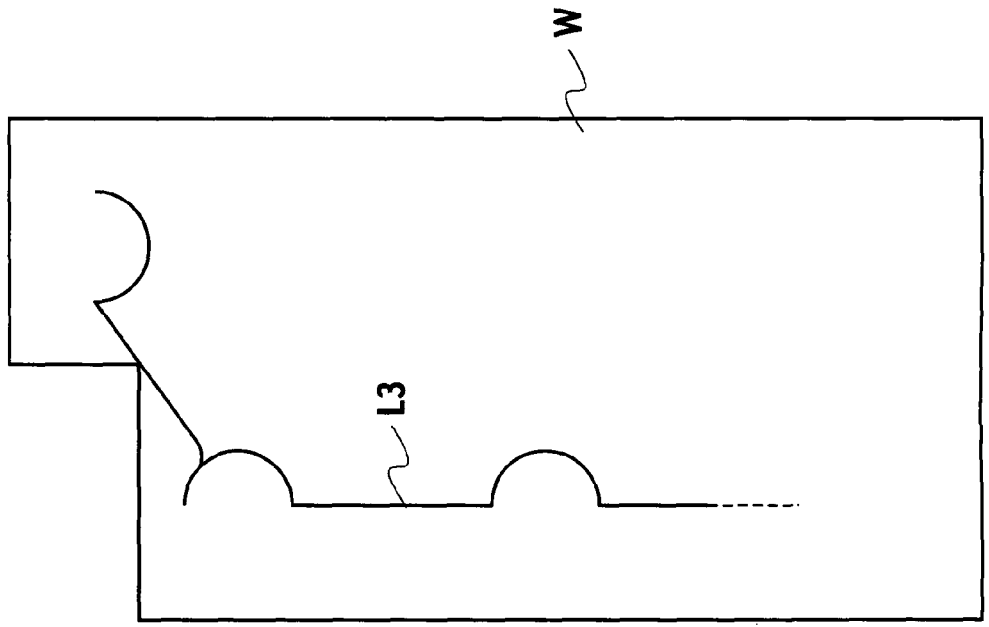
FIGS. 14A and 14B are explanatory drawings for explaining effects of the central-position mode and the working-pattern mode according to the embodiment.
Figure 14A:
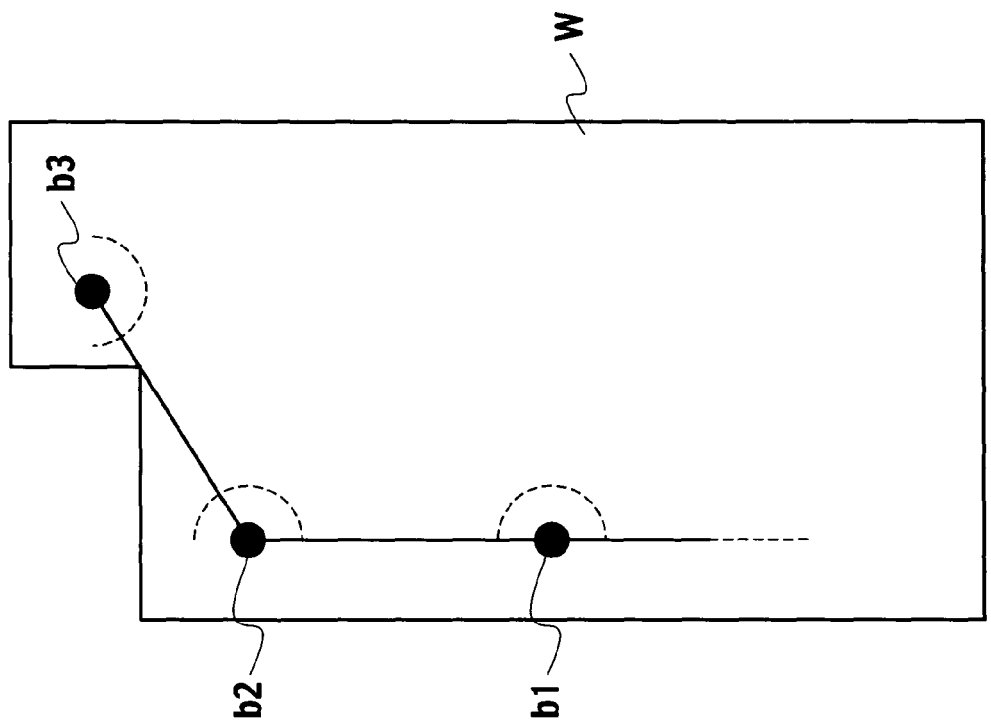

FIGS. 14A and 14B are explanatory drawings for explaining effects of the central-position mode and the working-pattern mode according to the embodiment, and regard to a case example where a shape of the working pattern is changed. Here, an S-shaped pattern is changed into a C-shaped pattern.

In the central-position mode, as shown in FIG. 14A, a position of a welding point is indicated by the visible laser beam even in a case where the working pattern has been changed. Accordingly, without reproducing the working pattern, it becomes possible to determine, based on a size and the central position of a welding point of a working pattern after the change, whether or not the working pattern after the change corresponds with the designed welding bead position.

In the working-pattern mode, on the other hand, as shown in FIG. 14B, a working pattern L3 is drawn by the visible laser beam in accordance with the working pattern after the change. Accordingly, whether or not welding according to the working pattern after the change can be applied can be checked.

As has been described above, when operations based on the teaching data taught so as to form welding beads by drawing a predetermined working pattern are tested, a difference between a designed welding point and a welding point obtained by reproducing the teaching data can be easily recognized by indicating the welding point itself instead of the working pattern by emitting a visible laser beam employing the central-position mode. Moreover, because the working-pattern mode for emitting the visible laser beam according to the working pattern is included, spread of welding beads with the working pattern can be checked.

Although the embodiment to which the present invention is applied has been described hereinabove, the present invention is not limited to such an embodiment. One of the operations at the time of working in the above-described embodiment is to emit a working pattern to one welding point in a state where the laser emitting apparatus 3 is being stopped. However, instead of this, welding toward welding points by using the working pattern may be applied, for example, by moving the laser emitting apparatus 3 and, at the same time, rotating the reflecting mirror to the welding points that can be irradiated within a range of the movement. In the test mode in the foregoing case, a visible light is configured to be emitted in accordance with teaching data for applying a welding operation of this kind. Accordingly, positions of welding points, a spread of welding points, and the like, can be checked even in the case of applying a welding operation of this kind.

The laser-beam scanning control unit 25 (corresponding to the working controller) for executing welding, and the test mode control unit 27 (corresponding to the working-position checking controller) for executing the test mode are formed separately inside the single robot control unit 7 in the described embodiment. However, it is not necessary to substantially separate these control units as the working controller and the working-position checking controller since, in reality, a so-called computer which operates by a predetermined program is used as the robot control unit 7 itself. The present invention can be implemented by having a program executed by the robot control unit 7, the program generated for performing the above-described working procedures.

Further, although a source of a visible light is provided inside the laser oscillator 5 in the above-described embodiment, the visible-light source may be located anywhere as long as the visible-light source can input the visible light into the laser emitting apparatus 3. For example, the visible light may be configured to be inputted to the laser emitting apparatus 3 by changing a connected destination of the optical fiber cable 6 from the laser oscillator 5 to the visible-light source prepared apart from the laser oscillator 5. Moreover, the visible-light source (which is, for example, a semiconductor laser, a light emitting diode, or the like) may be previously provided inside the laser emitting apparatus 3 in a manner allowing the visible light to be incident upon (inputted to) the reflecting mirror 11 with the same optical axis as a laser beam for working.

Furthermore, the laser beam itself for working may be used, instead of the visible light, also at the time of checking. That is, in the above-described embodiment, the laser beam for working is outputted on an "as-is" basis without switching to the visible light at the time of the test mode. Thereby, for example, because a trace indicating the central position remains with a checking pattern being drawn at the time of the central-position mode in the test mode, a working position can be checked on the work piece again after the completion of the checking operations. In the working-pattern mode, a pattern actually processed is obviously expected to be drawn on the work piece so as to be checked. Incidentally, in the case where the laser beam for working is used instead of the visible light at the time of the test mode, a laser output level of the laser oscillator 5 may be reduced from that at the time of working to the extent allowing the laser beam to lightly put a trace. Additionally, a dummy work may be used as the work piece.

The present invention described above, when checking operations based on the teaching data for use in a laser working apparatus which emits a laser in a scanning pattern (a working pattern) for working, a pattern (a checking pattern) indicating a reference position of the working pattern is drawn with a laser beam or with a visible light instead of the working pattern itself, whereby a difference between a designed reference position and a working position obtained by reproducing the teaching data can be clearly indicated.

In addition, the present invention is not limited to the embodiments detailed above and can assume various modified embodiments.

Besides the laser welding, the present invention can also be used in laser working, such as laser cutting and laser marking, other than welding.

What we claim is:

1. A laser working apparatus comprising:
a laser head provided with a reflector;
a laser oscillator configured to output a laser beam for welding and a visible beam, the laser oscillator being connected to the laser head such that one of the laser beam and the visible beam is inputted to the laser head;
a mover configured to move the laser head, the mover being attached to the laser head; and
a controller configured to control the mover so as to move the laser head in accordance with a previously taught movement route, and configured to also control the laser oscillator and laser head such that the laser oscillator outputs the laser beam and the laser beam inputted to the laser head irradiates a work piece in a predetermined working pattern,
wherein the controller comprises a working position checking controller configured to control the mover so as to move the laser head in accordance with the previously taught movement route, and configured to also control the laser oscillator and laser head such that the laser oscillator outputs the visible beam and the visible beam inputted to the laser head irradiates the work piece in a checking pattern indicating a reference position for the predetermined working pattern,
wherein the working position checking controller is provided with two alternative modes, the two alternative modes including a central position mode in which the visible beam irradiates the work piece at a central position of the predetermined working pattern and a working pattern mode in which the visible beam irradiates the work piece in a same pattern as the predetermined working pattern.

2. The laser working apparatus according to claim 1, wherein the working position checking controller is configured to keep the visible beam irradiating the work piece in the checking pattern over a same time period as required for the controller to keep the laser beam irradiating the work piece in the predetermined working pattern.

3. The laser working apparatus according to claim 2, wherein the working position checking controller is configured to stop movement of the reflector over the same time period as required for the controller to keep the laser beam irradiating the work piece in the predetermined working pattern.

4. The laser working apparatus according to claim 1, wherein the reference position is the central position of the predetermined working pattern.

5. A laser working apparatus comprising:
a laser head provided with a reflector, the reflector being configured to change a direction of an input beam;
a laser oscillator configured to output a laser beam for welding and a visible beam, the laser oscillator being connected to the laser head such that one of the laser beam and the visible beam is inputted to the laser head as the input beam;

a mover configured to move the laser head, the mover being attached to the laser head; and a controller having a work mode for welding in which the controller causes the mover to move the laser head in accordance with a movement route previously taught, causes the laser oscillator to set, as the input beam, the laser beam for welding, and controls the laser head to move the reflector such that the laser beam for welding irradiates a work piece in a predetermined working pattern, wherein the controller has a test mode for checking the movement route previously taught in which the controller causes the mover to move the laser head in accordance with the movement route previously taught, causes the laser oscillator to set, as the input beam, the visible beam, and controls the laser head to stop movement of the reflector such that the visible beam irradiates the work piece at a reference position for the predetermined working pattern.

6. The laser working apparatus according to claim 5, wherein, in the test mode, the controller is configured to keep the visible beam irradiating the work piece over a same time period as required when the controller keeps the laser beam irradiating the work piece in the predetermined working pattern in the work mode.

7. The laser working apparatus according to claim 6, wherein, in the test mode, the controller is configured to stop movement of the reflector over the same time period as required when the controller keeps the laser beam irradiating the work piece in the predetermined working pattern in the work mode.

8. The laser working apparatus according to claim 5, wherein the reference position is a central position of the predetermined working pattern.

9. The laser working apparatus according to claim 5, wherein, in the test mode, the controller is configured to be operable in a working-pattern mode in which the visible beam irradiates the work piece in a same pattern as the predetermined working pattern.

10. A method for controlling a laser working apparatus, the apparatus comprising a laser head with a reflector configured to change a direction of an input beam; a laser oscillator configured to output a laser beam for welding and a visible beam, the laser oscillator being connected to the laser head such that one of the laser beam and the visible beam is inputted to the laser head as the input beam; a mover configured to move the laser head, the mover being attached to the laser head; and a controller, the method comprising:

operating the controller in a work mode for welding by causing the mover to move the laser head in accordance with a movement route previously taught, causing the laser oscillator to set, as the input beam, the laser beam for welding, and controlling the laser head to move the reflector such that the laser beam for welding irradiates a work piece in a predetermined working pattern; and operating the controller in a test mode for checking the movement route previously taught by causing the mover to move the laser head in accordance with the movement route previously taught, causing the laser oscillator to set, as the input beam, the visible beam, and controlling the laser head to stop movement of the reflector such that the visible beam irradiates the work piece at a reference position for the predetermined working pattern.

11. A laser working apparatus comprising:

a laser head provided with a reflector, the reflector being configured to change a direction of an input beam;

a laser oscillator configured to output a laser beam for welding and a visible beam, the laser oscillator being connected to the laser head such that one of the laser beam and the visible beam is inputted to the laser head as the input beam;

a mover configured to move the laser head, the mover being attached to the laser head; and means for performing working in a work mode for welding by causing the mover to move the laser head in accordance with a movement route previously taught, causing the laser oscillator to set, as the input beam, the laser beam for welding, and controlling the laser head to move the reflector such that the laser beam for welding irradiates a work piece in a predetermined working pattern; and means for checking the movement route previously taught in a test mode by causing the mover to move the laser head in accordance with the movement route previously taught, causing the laser oscillator to set, as the input beam, the visible beam, and controlling the laser head to stop movement of the reflector such that the visible beam irradiates the work piece at a reference position for the predetermined working pattern.

\* \* \* \* \*